United States Patent
Schulz

[15] 3,659,688
[45] May 2, 1972

[54] CENTRIFUGALLY OPERATED CLUTCH IN A TWO-SPEED BICYCLE HUB

[72] Inventor: Horst Schulz, Schweinfurt, Germany
[73] Assignee: Fichtel & Sachs AG, Schweinfurt, Germany
[22] Filed: Aug. 27, 1970
[21] Appl. No.: 67,306

[30] Foreign Application Priority Data
Sept. 11, 1969 Germany..............P 19 45 972.4

[52] U.S. Cl..........................192/105 CE, 74/752 E, 192/46, 192/114 R
[51] Int. Cl.....................................F16d 43/24
[58] Field of Search.............192/46, 114 R, 41.5, 105 CE, 192/103 B; 74/752 E

[56] References Cited
UNITED STATES PATENTS 3,557,922  1/1971  Schwerdhoefer..................74/752 E
2,096,438  10/1937  Rockwell..........................192/103 B Primary Examiner—Benjamin W. Wyche
Assistant Examiner—Randall Heald
Attorney—Kelman and Berman

[57] ABSTRACT

One of the two pawl-and-ratchet clutches which connect the hub shell with the planet carrier and the ring gear in a two-speed bicycle hub is controlled by a centrifugal governor whose two flyweights are pivotally mounted on a common carrier with the pawl of the controlled clutch. A coupling disc is mounted on the carrier by means of a bearing pin whose axis is spacedly parallel to the hub axis. The disc is tilted by engagement with connecting pins on the flyweights, thereby coupling the flyweights for joint swinging movement about the respective pivot axes in the same direction, and preventing malfunctioning of the clutch by movement of the flyweights under the influence of forces other than centrifugal forces. A cam on the coupling disc holds the controlled pawl disengaged when the flyweights are near the axis of rotation.

14 Claims, 5 Drawing Figures

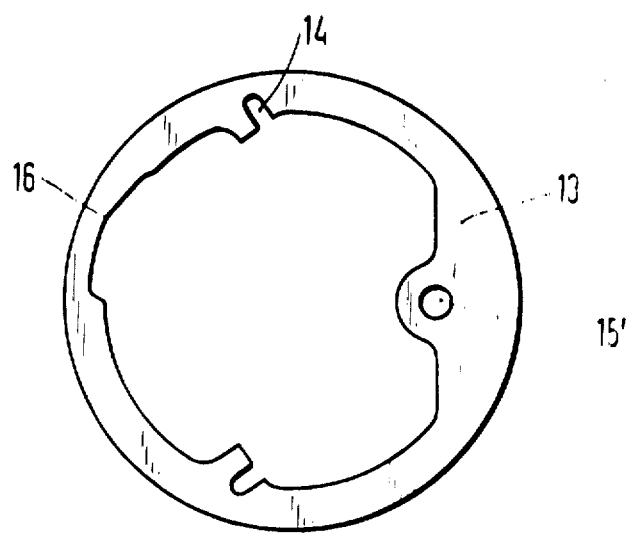

CENTRIFUGALLY OPERATED CLUTCH IN A TWO-SPEED BICYCLE HUB

This invention relates to centrifugally operated clutches, and particularly to a clutch in a multiple-speed bicycle hub whose engagement and disengagement changes the transmission ratio of the hub.

It is known to equip multiple-speed bicycle hubs with centrifugal governors for an automatic change in the transmission ratio of the hub when the input speed of the driver or the output speed of the hub shell varies. In transmissions in which torque is transmitted between several transmission elements rotating at different speed and the hub shell by respective overrunning clutches, the centrifugal governor is used for disengaging the clutch or clutches connecting the fast-moving transmission element, thereby permitting torque to be transmitted from a slower moving transmission member.

This invention is concerned with the problem of preventing malfunctioning of the governor when the flyweights are exposed to forces other than centrifugal forces which tend to move the flyweights. More particularly, the invention aims at mounting a plurality of flyweights in such a manner that they move in opposite linear directions under the influence of centrifugal forces, and to couple them to each other so that they can only move in such opposite directions, thereby preventing their movement under the influence of linear forces.

While such coupling arrangements have been proposed heretofore, and have achieved a measure of success, it is an object of the invention to simplify the manufacture and operation of centrifugal governors having coupled flyweights, and to improve their sensitivity, reliability, and durability. A more specific object is the provision of a governor in which the coupling arrangement consists of a minimum number of simple parts whose dimensions are sufficiently non-critical to minimize the effects of wear. Yet another object is the provision of a centrifugal governor whose coupling elements move through very short paths during their operation and are not significantly impeded by friction even when exposed to dust and other contaminants.

In its more specific aspects, the invention provides a centrifugal governor with a bearing on the carrier for the flyweights. A coupling member is mounted on the bearing for angular movement about the bearing axis which is radially spaced from the axis of rotation of the carrier. Each flyweight is connected to the coupling member in such a manner as to cause angular movement of the coupling member during movement of the flyweights toward and away from the axis of rotation, and thereby to couple the flyweights to each other for joint movement. When the flyweights make a swinging movement about respective pivot axes on the carrier, as is preferred, they are coupled in such a manner that they jointly swing in the same direction about the respective pivot axes.

Other features, additional objects, and many of the attendant advantages of this invention will readily become apparent from the following detailed description of a preferred embodiment when considered in connection with the appended drawing in which:

FIG. 5 shows an element of the same device in enlarged side elevation.

Figure 1:
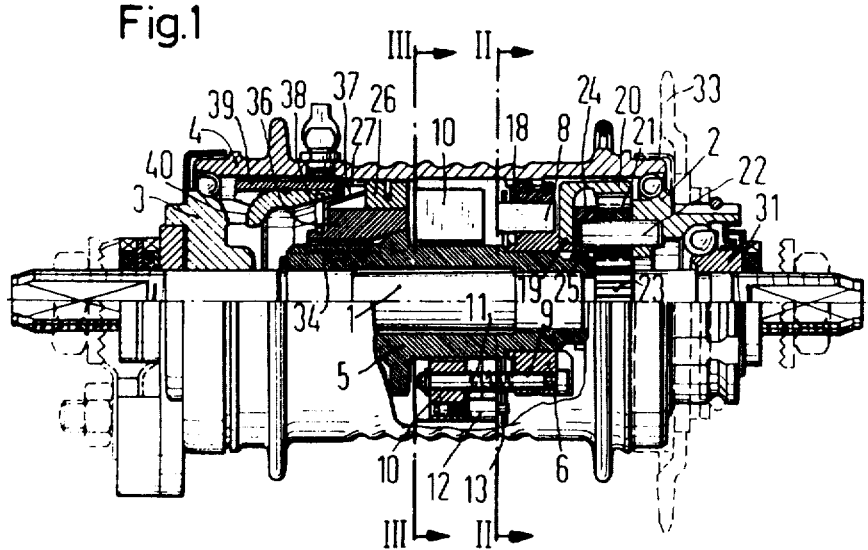
FIG. 1 shows a two-speed hub for a bicycle equipped with a centrifugally controlled clutch of the invention in rear elevation and partly in section through its axis of rotation.

The bicycle hub illustrated is mounted on a normally stationary shaft 1 whose ends carry axially adjustable bearing rings 3, 31. A driver 2 is rotatably mounted on the ring 31 and is integral with a sprocket 33 for the non-illustrated drive chain. The shell 4 of the hub is rotatably mounted on the driver 2 and the ring 3.

The hub shell 4 encloses planetary gearing including a sun gear 23 fixedly fastened on or integral with the shaft 1, a planet carrier which is an integral portion of the driver 2 and is provided with three planet gears 12 on planet shafts 22, the gears 21 simultaneously meshing with the sun gear 23 and with an enveloping ring gear 20, only one planet gear being seen in the drawing. A retaining ring 24 connects the free ends of the planet shafts 22 and fixedly couples the driver and planet carrier 2 to a sleeve 5 coaxially rotatable on the shaft 1 in the assembled condition of the hub, interengaged projections and recesses 25 connecting the ring 24 to the sleeve 5.

External threads 34 on the sleeve 5 carry a movable brake member 36 whose external conical face 37 engages a conforming inner face 38 of another brake member 39 normally secured against rotation on the shaft 1 by interengaged projections 40 on the member 39 and on the ring 3. During back pedalling, the brake member 36, whose rotation is impeded by a friction spring, moves axially into engagement with the brake member 39, as is known. Two diametrically opposite pawls 26 are secured against rotation on the brake member 36 and are spring-biased toward engagement with ratchet teeth 27 on the inner face of the hub shell 4 in all axial positions of the brake member 36.

Interengaged teeth 19 fixedly connect the ring gear 20 with an annular carrier 6 in the assembled hub. The carrier 6 is freely rotatable on the sleeve 5, but secured against axial displacement. A pawl 8 arranged on the carrier 6 in a peripheral pocket 7 is biased by a pawl spring 30 toward engagement with ratchet teeth on a ring 18 which is splined to the inner wall of the shell 4. The ratchet teeth on the ring 18 have been omitted from the drawing for the sake of clarity, but are substantially identical with the teeth 27.

The elements of the hub described so far operate as follows:

When torque is transmitted between the driver 2 and the shell 4 by the overrunning clutch constituted by the pawl 26 and the ratchet teeth 27, the shell rotates at the same speed as the driver. When torque is transmitted by the other overrunning clutch constituted by the pawl 8 and the teeth on the ring 18, the hub shell 4 turns with the ring gear 20 at a speed higher than that of the driver 2. The operative clutch is selected by a centrifugal governor with which this invention is more specifically concerned.

The carrier 6 which supports the pawl 8 performs the same function for the elements of the governor. Two axial pins 9 fixedly mounted on the carrier 6 in diametrically opposite eccentric positions provide pivots for respective flyweights 10 having each the approximate shape of one half of a heavy flat ring. Each pivot pin 9 passes freely through a bore in a circumferential end portion of the associated weight 10, and a return spring 11 coiled about the pin biases the weight toward the illustrated position in which the arcuate inner face of the weight is closely adjacent the sleeve 5.

A flat annular coupling disc 13, best seen in FIG. 5, is pivotally mounted on the carrier 6 by means of a fixed bearing pin 15 eccentrically arranged on the carrier and angularly equidistant from the pivot pins 9. The pin 15 engages an opening 15′ conformingly in the disc 13 which restricts the disc to pivotal movement about the axis of the pin 15. The disc 13 envelopes and clears the pins 9 in all its angular positions. Axially projecting connecting pins 12 are arranged on the flyweights 10 adjacent the pivot pins 9 in such a manner that the connecting pins respectively move arcuately toward and away from a line through the axes of the pins 9 and the axis of rotation of the hub when the flyweights swing away from the sleeve 5. The pins 12 respectively engage elongated slots 14 in the inner circumference of the disc 13 whose longitudinal axes intersect in the opening 15′. A cam face 16 on the inner circumference of the disc 13 engages an axial end portion of the pawl 8 in such a manner as to keep the pawl out of engagement with the ratchet ring 18 in one angular position of the disc during its movement in a circular arc about the pin 15, and to release the pawl for engagement with the ring under the biasing force of the spring 30 in another disc position. The disc is shifted between these positions by the connecting pins 12 when the flyweights swing on their pivot pins 9.

Figure 2:
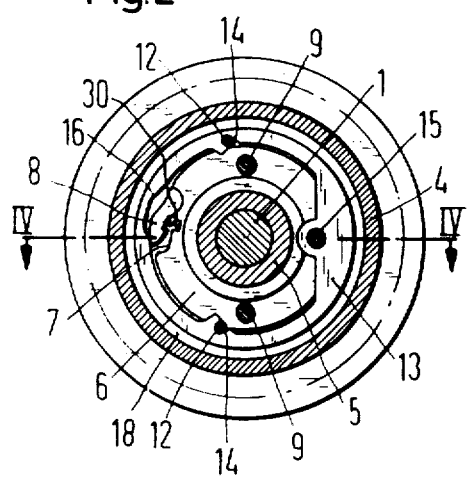
FIGS. 2 and 3 illustrate the device of FIG. 1 in respective side elevational sections on the lines II—II and III—III.
Figure 3:
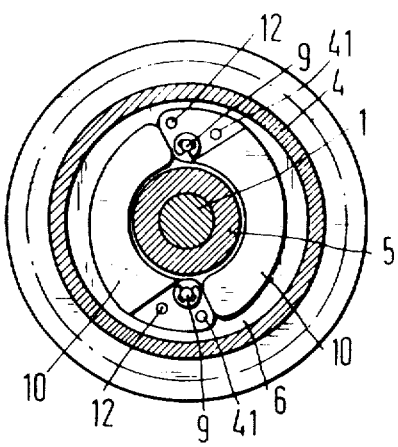
Figure 4:
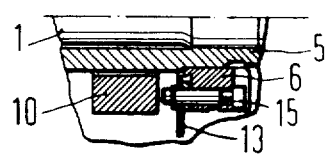
FIG. 4 shows a detail in section on the line IV—IV in FIG. 2.

When the flyweights 10 assume the positions shown in FIG. 3 while the hub stands still or turns relatively slowly about its axis, the cam face 16 retracts the pawl 8 from torque-transmitting engagement with the ring 18, as is seen in FIG. 2. The hub shell 4 therefore rotates at the speed of the sprocket 33 and the driver 2. At a rotary speed of the ring gear 20 and of the carrier 6 at which the flyweights can overcome the restraint of the return springs 11, the pins 12 turn the disc 13 counterclockwise on the bearing pin 15, as viewed in FIGS. 2 and 3, to permit engagement of the clutch 8, 18 and rotation of the hub shell 4 at the speed of the ring gear 20. The ratchet teeth 27 overrun the pawls 26.

For the convenience of manufacture and for reducing the number of different spare parts for the hub, the pivotally fastened end of each flyweight 10 has two openings 41 equidistant from the pivot axis of the pin 9 but oppositely spaced from the afore-mentioned line through the pivot axes, and therefore nearer and farther respectively from the end of the weight. The pins 12 respectively engage the near and the far opening 41 of the two structurally identical flyweights which may consist of sintered powder metal, or be made by pressure casting or by other methods which avoid most or all secondary machining operations.

In the two-speed bicycle hub chosen for illustrating the centrifugal governor of the invention, the entire internal cross section of the hub between the sleeve 5 and the shell 4 is available for the carrier 6 and the control disc 13. In more complex hubs, the radial dimensions of the available space may be smaller, and in such applications, the pawl 8 may be moved closer to the hub axis, and the diameter of the disc 13 may be reduced. In such an arrangement, the central opening of the disc is preferably reduced so as only to receive the sleeve 5, and suitably dimensioned individual openings are provided for the pivot pins 9 and the connecting pins 12.

While the invention has been described and illustrated in its application to multiple speed bicycle hubs, it is equally useful wherever the available space is restricted and inertial response of the flyweights to movement of the entire governor is to be avoided. Such an application is found, for example, in washing machines whose drive units are not fixedly fastened to a stationary frame, and are therefore subjected to vibration during normal operation.

The advantages of greater reliability, sensitivity, and durability achieved by the governor of the invention as compared to similar known devices are due primarily to the off-center mounting of the bearing pin 15 on the carrier 6. This permits the cam face 16 which is diametrically opposite the bearing axis to move linearily over a relatively great distance, sufficient for reliable engagement and disengagement of the pawl 8 while the angular movement of the coupling disc 12 is minimal and virtually unaffected by friction at the bearing or anywhere else. The connecting pins 12 are closely adjacent the axes of the pivot pins 9, but the cooperating slots 14 in the disc 13 are relatively far from the bearing axis of the pin 15 so that the coupling disc 12 is moved by the flyweights 10 at a substantial mechanical advantage which permits the use of relatively small flyweights rotating at the speed of the ring gear 20 without a further speed-up transmission.

The paucity of moving parts in the centrifugal governor and the simplicity of these parts are evident from the drawing and the preceding description. The governor occupies very little of the limited space available in a bicycle hub or in similar confining enclosures, and utilizes the space to best advantage.

It should be understood, of course, that the foregoing disclosure relates only to a preferred embodiment of the invention, and that it is intended to cover all changes and modifications of the example of the invention herein chosen for the purpose of the disclosure which do not depart from the scope and spirit of the appended claims.

What is claimed is:

1. In a centrifugally operated clutch having two engageable clutch elements (8, 18) mounted for rotation about a common first axis and for movement of one element (8) toward and away from the other element (18) between an engaged and a disengaged position, yieldably resilient means (30) biasing said one element toward one of said positions thereof; a centrifugal governor having a second axis and including a carrier (6) mounted for rotation about said second axis, a plurality of flyweights (10) mounted on said carrier for movement away from said second axis in response to centrifugal forces when said carrier rotates, and return means (11) for causing return movement of said flyweights toward said second axis; and motion transmitting means (16) interposed between said flyweights and said one clutch element for moving the latter toward the other position thereof in response to one of said movements of said flyweights, the improvement which comprises:

a. bearing means (15) on said carrier defining a pivot bearing axis radially spaced from said second axis;

b. a coupling member (13) pivotally mounted on said bearing means for oscillatory movement about said pivot bearing axis; and c. connecting means (12) connecting each of said flyweights to said coupling member for said angular movement of the coupling member during said movement of said flyweights, and thereby coupling said flyweights for joint movement toward and away from said second axis.

2. In a clutch as set forth in claim 1, said flyweights being mounted on said carrier for swinging movement about respective pivot axes extending in a common direction, said connecting means coupling said flyweights for joint swinging movement in the same direction about the respective pivot axes.

3. In a clutch as set forth in claim 1, said one clutch element being mounted on said carrier for movement between said positions thereof.

4. In a clutch as set forth in claim 3, said one clutch element being a pawl, and said other clutch element being a ratchet member, said yieldably resilient means biasing said pawl toward the engaged position.

5. In a clutch as set forth in claim 3, said first and second axes coinciding, said carrier having a radially extending first face and a circumferential second face, said one clutch element being mounted on said second face for radial movement toward and away from the other clutch element, a plurality of pivot members projecting from said first face, having respective pivot axes, extending in the direction of said coinciding axes, and supporting said flyweights for swinging movement about said pivot axes respectively, said coupling member being interposed between said flyweights and said carrier in the direction of said coinciding axes.

6. In a clutch as set forth in claim 5, said motion transmitting means being operatively interposed between said coupling member and said one clutch member.

7. In a clutch as set forth in claim 6, said motion transmitting means including cam means on said coupling member cammingly engaging said one clutch member during said angular movement.

8. In a clutch as set forth in claim 7, said cam means and said bearing axis being spaced from said connecting means in the opposite directions.

9. In a clutch as set forth in claim 7, said coupling member being substantially annular about said coinciding axes, said bearing means engaging a portion of said coupling member substantially diametrically opposite said cam means, said plurality of flyweights consisting of two flyweights, said portion of said coupling member and said cam means being oppositely spaced from a line connecting said pivot axes.

10. In a clutch as set forth in claim 9, said connecting means including two connecting members respectively extending from portions of said flyweights closely adjacent said pivot axes into elongated openings of said coupling member.

11. In a clutch as set forth in claim 10, said two flyweights being identical and formed each with two bores substantially equidistant from said pivot axis, each bore of one flyweight corresponding to a bore of the other flyweight, one of said connecting members being received in one bore of one flyweight, and the other connecting member being received in the bore of the other flyweight corresponding to the other bore of said one flyweight.

12. In a clutch as set forth in claim 9, said pivot axes being each substantially equidistant from said cam means and from said bearing axis.

13. In a clutch as set forth in claim 1, said coupling member moving in a circular arc about said bearing axis during said angular movement thereof.

14. In a clutch as set forth in claim 1, said bearing means including a bearing member conformingly engaging said coupling member and restricting the same to pivotal movement about said bearing axis.

* * * * *